US012794056B2

(12) United States Patent
Xu et al.

(10) Patent No.: US 12,794,056 B2
(45) Date of Patent: Nov. 10, 2026

(54) BATTERY CELL AND ELECTRONIC APPARATUS USING BATTERY CELL

(71) Applicant: Ningde Amperex Technology Limited, Ningde (CN)

(72) Inventors: Hu Xu, Ningde (CN); Huabing Song, Ningde (CN)

(73) Assignee: Ningde Amperex Technology Limited, Ningde City (CN)

( * ) Notice: Subject to any disclaimer, the term of this patent is extended or adjusted under 35 U.S.C. 154(b) by 697 days.

(21) Appl. No.: 18/345,594

(22) Filed: Jun. 30, 2023

(65) Prior Publication Data

US 2023/0344050 A1 Oct. 26, 2023

Related U.S. Application Data

(63) Continuation of application No. PCT/CN2020/141921, filed on Dec. 31, 2020.

(51) Int. Cl.

*H01M 50/198* (2021.01)
*H01M 50/103* (2021.01)
*H01M 50/119* (2021.01)
*H01M 50/14* (2021.01)
*H01M 50/186* (2021.01)

(52) U.S. Cl.

CPC ....... *H01M 50/198* (2021.01); *H01M 50/103* (2021.01); *H01M 50/14* (2021.01); *H01M 50/186* (2021.01)

(58) Field of Classification Search

CPC .. H01M 50/198; H01M 50/103; H01M 50/14; H01M 50/186; H01M 50/119; H01M 50/597; H01M 2220/30; Y02E 60/10

See application file for complete search history.

(56) References Cited

U.S. PATENT DOCUMENTS

2009/0274953 A1* 11/2009 Myers ................. H01M 50/103 429/100

FOREIGN PATENT DOCUMENTS

CN 103242750 A 8/2013
CN 203690420 U 7/2014

(Continued)

OTHER PUBLICATIONS

International Search Report and Written Opinion issued on Sep. 8, 2021, in corresponding International Application No. PCT/CN2020/141921, 15 pages.

(Continued)

*Primary Examiner* — Lisa S Park

(74) *Attorney, Agent, or Firm* — Maier & Maier, PLLC

(57) ABSTRACT

A battery cell including an electrode assembly, a housing, and a first bonding portion. The electrode assembly includes a first end surface, and a first surface and a second surface disposed face away from each other. The housing includes a first inner wall and a second inner wall disposed opposite each other. The first bonding portion includes a first adhesive layer and a second adhesive layer. The first adhesive layer is bonded to the first end surface and extends to the first surface and the second surface to bond with the first surface and the second surface. The second adhesive layer includes a first portion, a second portion, and a third portion connected in sequence, where the second portion is located on a side of the first adhesive layer face away from the first end surface.

10 Claims, 11 Drawing Sheets

(56) References Cited

FOREIGN PATENT DOCUMENTS

| | | | | |
|---|---|---|---|---|
| CN | 205723715 | | * | 11/2016 |
| CN | 205723715 | U | | 11/2016 |
| CN | 109274878 | A | | 1/2019 |
| CN | 208352449 | U | | 1/2019 |
| CN | 110504400 | | * | 11/2019 |
| CN | 210040338 | | * | 2/2020 |
| CN | 210040338 | U | | 2/2020 |
| CN | 111200155 | A | | 5/2020 |
| JP | 2017130319 | A | | 7/2017 |
| JP | 2020116880 | A | | 8/2020 |
| WO | 2016090868 | A1 | | 6/2016 |
| WO | 2016192051 | A1 | | 12/2016 |

OTHER PUBLICATIONS

Office Action issued on Jan. 5, 2023, in corresponding Chinese Application No. 202080032273.8, 8 pages.

* cited by examiner

BATTERY CELL AND ELECTRONIC APPARATUS USING BATTERY CELL

TECHNICAL FIELD

This application relates to the field of batteries, and in particular, to a battery cell and an electronic apparatus using such battery cell.

BACKGROUND

With the mature application of consumer electronic products, customers are paying increasing attention to the risk of using the entire devices. For example, a drop resistance requirement for electronic products is increasingly high. As an important component of electronic products, batteries are also required to have drop resistance. Therefore, how the drop resistance of batteries is effectively improved is a technical problem to be solved in this application.

SUMMARY

In view of the foregoing situation, it is necessary to provide a battery cell and an electronic apparatus using such battery cell so as to improve safety and alleviate failure.

An embodiment of this application provides a battery cell including an electrode assembly, a housing, and a first bonding portion. The electrode assembly includes a first end surface, and a first surface and a second surface disposed face away from each other, where the first end surface connects the first surface and the second surface. The housing accommodates the electrode assembly; and the housing includes a first inner wall and a second inner wall disposed opposite to each other, where the first inner wall is disposed face the first surface and the second inner wall is disposed face the second surface. The first bonding portion includes a first adhesive layer and a second adhesive layer provided between the housing and the first adhesive layer. The first adhesive layer is bonded to the first end surface and extends to the first surface and the second surface to bond with the first surface and the second surface. The second adhesive layer includes a first portion. The first portion is bonded to the first inner wall. A bonding force between the first portion and the first adhesive layer is smaller than a bonding force between the first portion and the first inner wall and smaller than a bonding force between the first adhesive layer and the first surface.

In an embodiment of this application, the second adhesive layer further includes a second portion connected to the first portion. The second portion is located on a side of the first adhesive layer ace away from the first end surface. The bonding force between the first portion and the first adhesive layer is smaller than a bonding force between the second portion and the first adhesive layer.

In an embodiment of this application, the second adhesive layer further includes a third portion opposite the first portion, where the third portion is bonded to the second inner wall, and a bonding force between the third portion and the first adhesive layer is smaller than a bonding force between the third portion and the second inner wall and smaller than a bonding force between the first adhesive layer and the second surface.

In an embodiment of this application, the bonding force between the third portion and the first adhesive layer is smaller than a bonding force between the second portion and the first adhesive layer.

In an embodiment of this application, a centrosymmetric line of the first bonding portion coincides with a centrosymmetric line of the electrode assembly.

In an embodiment of this application, the battery cell further includes a second end surface face away from the first end surface, where the second end surface connects the first surface and the second surface. The battery cell further includes a second bonding portion, where the second bonding portion includes a third adhesive layer and a fourth adhesive layer. The third adhesive layer is bonded to the second end surface and extends to the first surface and the second surface to bond with the first surface and the second surface. The fourth adhesive layer includes a fourth portion, a fifth portion, and a sixth portion connected in sequence, where the fifth portion is located on a side of the third adhesive layer face away from the second end surface, the fourth portion is bonded to the first inner wall, and a bonding force between the fourth portion and the third adhesive layer is smaller than a bonding force between the fourth portion and the first inner wall and smaller than a bonding force between the third adhesive layer and the first surface.

In an embodiment of this application, the sixth portion is bonded to the second inner wall, and a bonding force between the sixth portion and the third adhesive layer is smaller than a bonding force between the sixth portion and the second inner wall and smaller than a bonding force between the third adhesive layer and the second surface.

In an embodiment of this application, a centrosymmetric line of the second bonding portion coincides with a centrosymmetric line of the electrode assembly.

Another embodiment of this application provides a battery cell including an electrode assembly, a housing, and a first bonding portion. The electrode assembly includes a first end surface, and a first surface and a second surface disposed face away from each other, where the first end surface connects the first surface and the second surface. The housing accommodates the electrode assembly, where the housing includes first inner wall and a second inner wall disposed face each other, the first inner wall being disposed face the first surface and the second inner wall being disposed opposite the second surface. The first bonding portion includes a first adhesive layer and a second adhesive layer provided between the housing and the first adhesive layer, where the first adhesive layer is bonded to the first end surface and extends to the first surface and the second surface to bond with the first surface and the second surface. The second adhesive layer includes a first portion, a second portion, and a third portion connected in sequence, where the second portion is located on a side of the first adhesive layer face awayface away from the first end surface, the first portion is bonded to the first inner wall but not bonded to the first adhesive layer opposite the first inner wall, and the second portion is bonded to the second inner wall but not bonded to the first adhesive layer opposite the second inner wall.

In an embodiment of this application, the battery cell further includes a second end surface face awayface away from the first end surface, where the second end surface connects the first surface and the second surface. The battery cell further includes a second bonding portion, where the second bonding portion includes a third adhesive layer and a fourth adhesive layer. The third adhesive layer is bonded to the second end surface and extends to the first surface and the second surface to bond with the first surface and the second surface. The fourth adhesive layer includes a fourth portion, a fifth portion, and a sixth portion connected in sequence, where the fifth portion is located on a side of the third adhesive layer face awayface away from the second end surface, the fourth portion is bonded to the first inner wall but not bonded to the first adhesive layer opposite the first inner wall, and the sixth portion is bonded to the second inner wall but not bonded to the first adhesive layer opposite the second inner wall.

Another embodiment of this application further provides an electronic apparatus including any one of the foregoing battery cells.

In the battery cell and the electronic apparatus using such battery cell in the embodiments of this application, when the battery cell drops, the second adhesive layer can restrict the displacement between the electrode assembly and the housing, and the second portion can provide a cushion for the electrode assembly, which facilitates maintenance of the stability of the battery cell. In a case of large impact, the second adhesive layer is at least partially separated from the first adhesive layer, reducing mutual pulling between the electrode assembly and the second adhesive layer, thus reducing the risk of tearing the electrode plate in the electrode assembly and the housing. In addition, the second adhesive layer keeps restricting the displacement of the electrode assembly, thus reducing the risk of deformation and short circuits of the electrode assembly caused by impact of the electrode assembly on the housing.

REFERENCE SIGNS OF MAIN COMPONENTS

| | |
|---|---|
| battery cell | 100 |
| electrode assembly | 10 |
| housing | 30 |
| first bonding portion | 50 |
| second bonding portion | 60 |
| first end surface | 11 |

-continued

| | |
|---|---|
| second end surface | 13 |
| first surface | 15 |
| second surface | 17 |
| accommodating cavity | 301 |
| first inner wall | 31 |
| second inner wall | 33 |
| first adhesive layer | 51 |
| second adhesive layer | 53 |
| first portion | 531 |
| second portion | 533 |
| third portion | 535 |
| first tab | 101 |
| second tab | 103 |
| third adhesive layer | 61 |
| fourth adhesive layer | 63 |
| fourth portion | 631 |
| fifth portion | 633 |
| sixth portion | 635 |
| electronic apparatus | 200 |

This application will be further described with reference to the accompanying drawings in the following specific embodiments.

DETAILED DESCRIPTION

The following clearly and completely describes the technical solution in the embodiments of this application with reference to the accompanying drawings in the embodiments of this application. Apparently, the described embodiments are only some rather than all of the embodiments of this application.

Unless otherwise defined, all technical and scientific terms used herein shall have the same meanings as commonly understood by those skilled in the art to which this application pertains. The terms used herein in the specification of this application are for description of specific embodiments only without any intention to limit this application.

Some embodiments of this application are described in detail below. Provided that there is no conflict, the following examples/embodiments and features in the examples/embodiments may be combined with each other.

Figure 1:
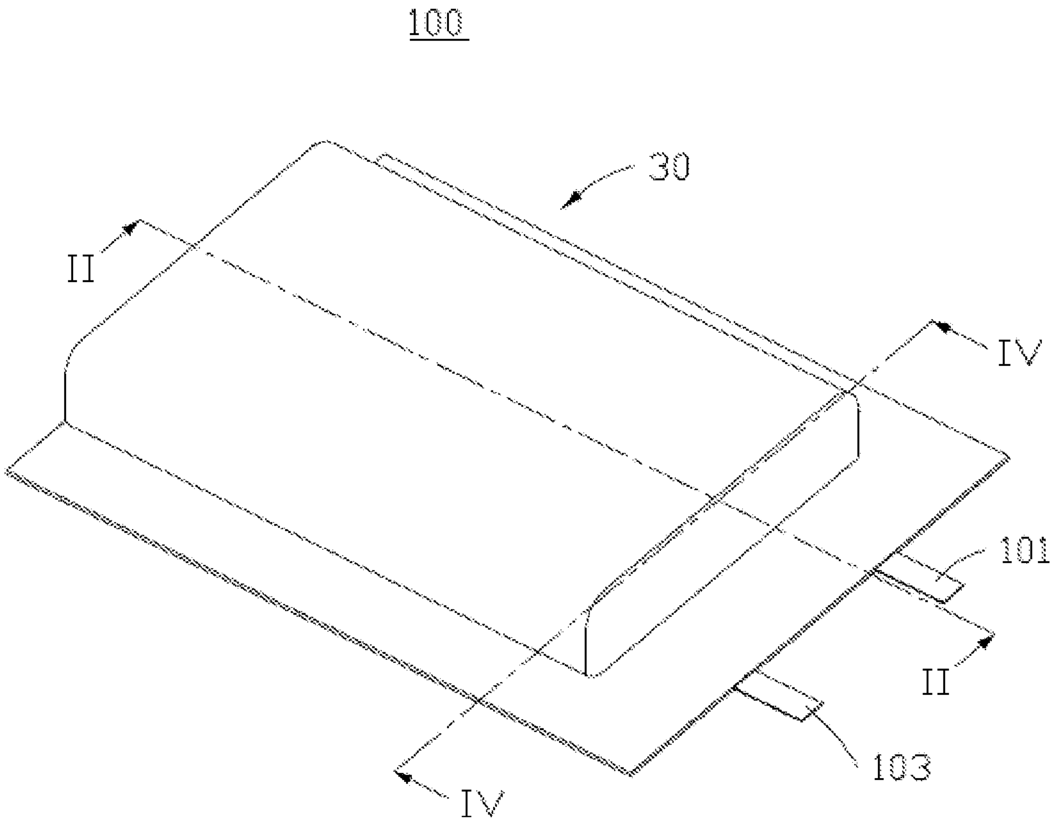
FIG. 1 is a schematic structural diagram of a battery cell according to an embodiment of this application.
Figure 2:
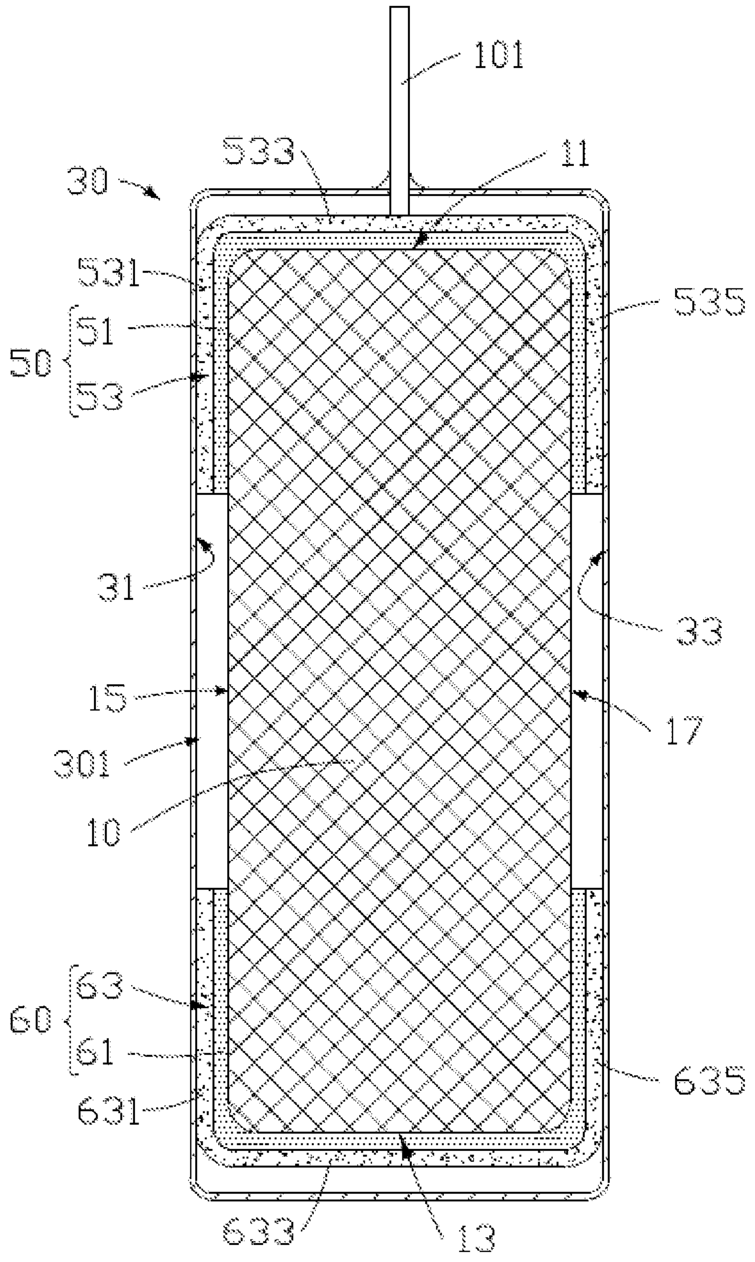
FIG. 2 is a cross-sectional view of a battery cell according to an embodiment of this application along the II-II line.

Refer to FIG. 1 and FIG. 2. A battery cell 100 according to an embodiment of this application includes an electrode assembly 10, a housing 30, and a first bonding portion 50.

Figure 3:
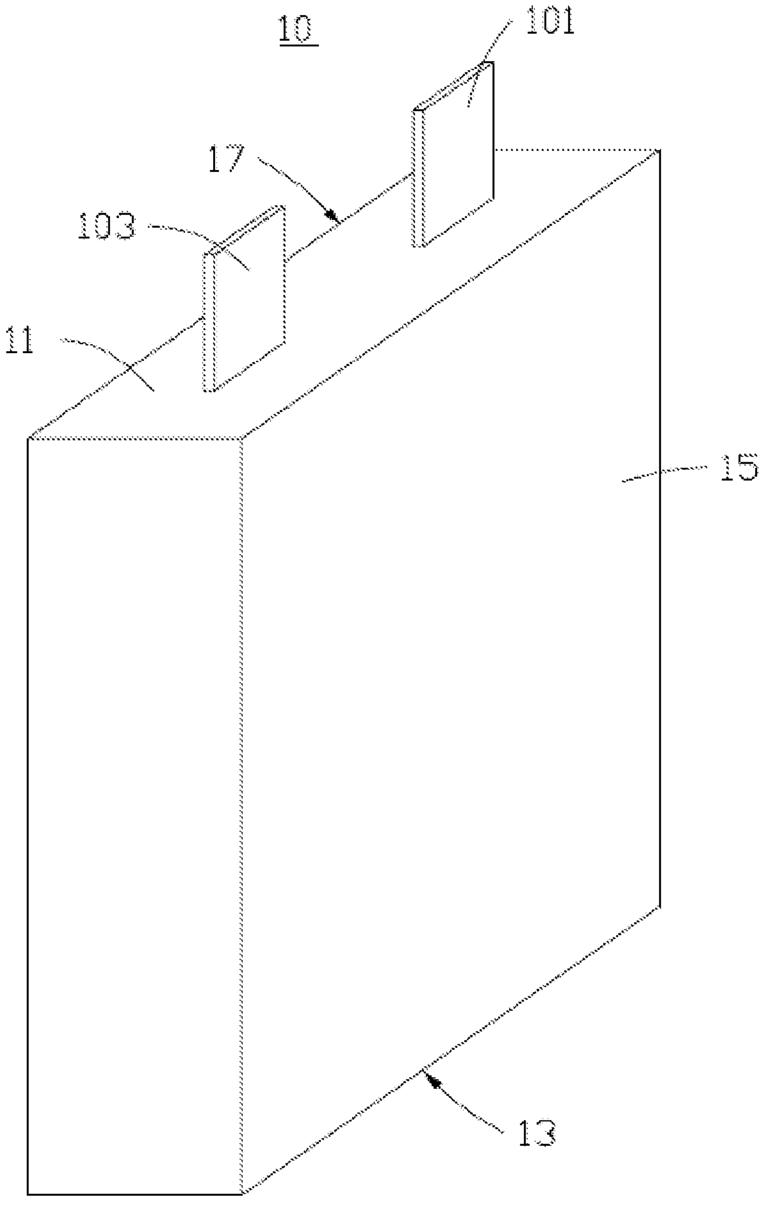
FIG. 3 is a schematic structural diagram of an electrode assembly according to an embodiment of this application.

Refer to FIG. 2 and FIG. 3. The electrode assembly 10 includes a first end surface 11, a second end surface 13, a first surface 15, and a second surface 17. The first end surface 11 and the second end surface 13 are disposed face away from each other, and the first surface 15 and the second surface 17 are disposed face away from each other. The first end surface 11 and the second end surface 13 are both connected between the first surface 15 and the second surface 17. In this embodiment, the electrode assembly 10 is formed by stacking or stacking and winding at least two electrode plates (not shown in the figure) and a separator (not shown in the FIG. disposed between two adjacent electrode plates.

The housing 30 is provided with an accommodating cavity 301 for accommodating the electrode assembly 10. The housing 30 includes a first inner wall 31 and a second inner wall 33 disposed opposite each other, where the first inner wall 31 and the first surface 15 are disposed face each other, and the second inner wall 33 and the second surface 17 are disposed face each other.

Figure 4:
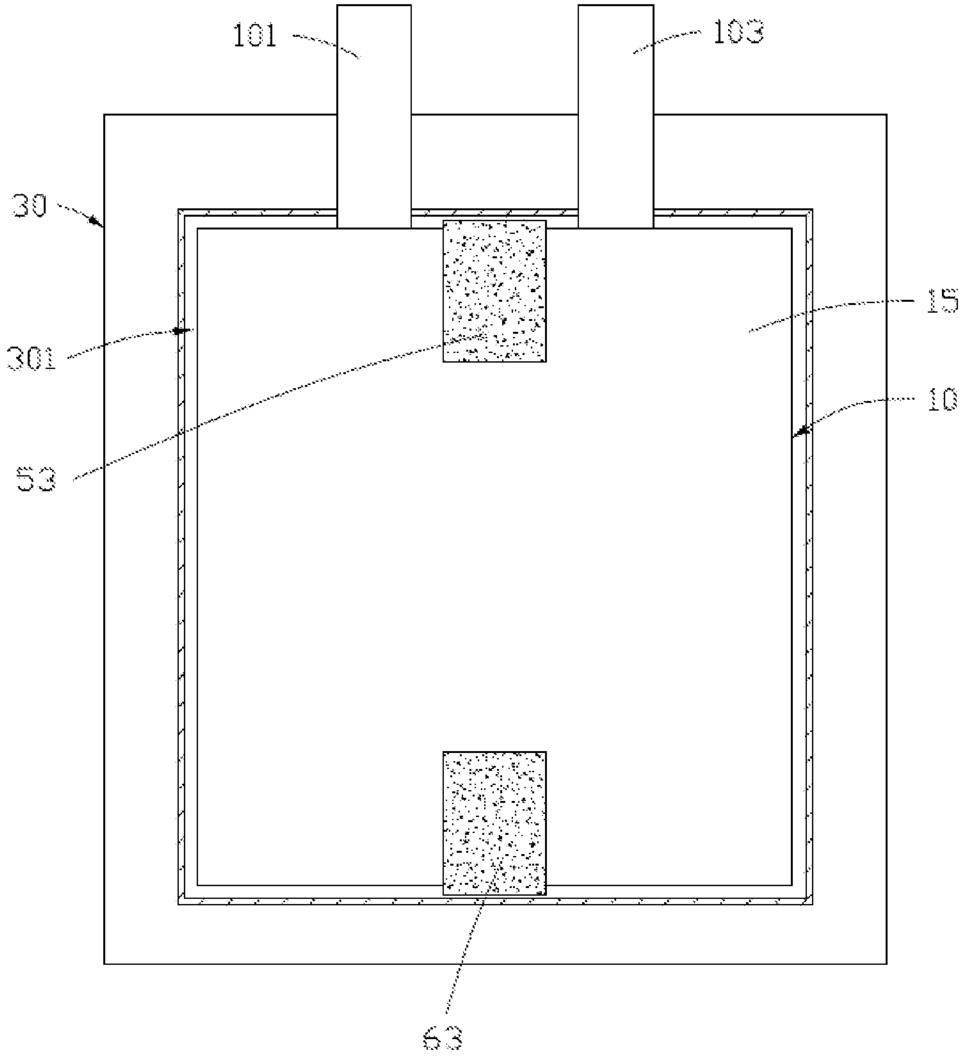
FIG. 4 is a cross-sectional view of a battery cell according to an embodiment of this application along the IV-IV line.

Refer to FIG. 2 and FIG. 4. The first bonding portion 50 includes a first adhesive layer 51 and a second adhesive layer 53, where the second adhesive layer 53 is disposed between the housing 30 and the first adhesive layer 51. The first adhesive layer 51 may be but is not limited to a hot melt adhesive, and the second adhesive layer 53 may be but is not limited to a polyester film.

The first adhesive layer 51 is bonded to the first end surface 11 and extends to the first surface 15 and the second surface 17 to bond with the first surface 15 and the second surface 17. This facilitates structural stability of the electrode assembly 10. When the battery cell 100 drops, the first adhesive layer 51 stabilizes the structure of the electrode assembly 10, and can bonds with the separator in the electrode assembly 10 when bonding with the first end surface 11, preventing the separator from shrinking, thereby reducing the risk of short circuits in the battery cell 100.

The second adhesive layer 53 includes a first portion 531, a second portion 533, and a third portion 535 connected in sequence. The second portion 533 is attached to a side of the first adhesive layer 51 face away from the first end surface 11, and the first portion 531 bonds the first inner wall 31 and a part of the first adhesive layer 51 located on the first surface 15. A bonding force between the first portion 531 and the first adhesive layer 51 is smaller than a bonding force between the first portion 531 and the first inner wall 31 and smaller than a bonding force between the first adhesive layer 51 and the first surface 15. When the battery cell 100 drops, the second adhesive layer 53 can restrict the displacement between the electrode assembly 10 and the housing 30. The second portion 533 can provide a cushion for the electrode assembly 10, which facilitates maintenance of the stability of the battery cell 100. In a case of large impact, still refer to FIG. 5. The second adhesive layer 53 is at least partially separated from the first adhesive layer 51, reducing mutual pulling between the electrode assembly 10 and the second adhesive layer 53, thus reducing the risk of tearing the electrode plate in the electrode assembly 10 and the housing 30. In addition, the second adhesive layer 53 keeps restricting the displacement of the electrode assembly 10, thus reducing the risk of deformation and short circuits of the electrode assembly 10 caused by impact of the electrode assembly 10 on the housing 30.

Further, the bonding force between the first portion 531 and the first adhesive layer 51 may be smaller than a bonding force between the second portion 533 and the first adhesive layer 51. Therefore, when the battery cell 100 drops, this can reduce the risk of tearing the electrode plate in the electrode assembly 10 and the housing 30 and facilitate restriction of the displacement of the electrode assembly 10 in the housing 30.

In some embodiments, the third portion 535 bonds the second inner wall 33 and a part of the first adhesive layer 51 on the second surface 17. A bonding force between the third portion 535 and the first adhesive layer 51 may be smaller than a bonding force between the third portion 535 and the second inner wall 33 and smaller than a bonding force between the first adhesive layer 51 and the second surface 17. This helps to reduce the risk of tearing the electrode plate in the electrode assembly 10 and the housing 30 during a drop.

Further, the bonding force between the third portion 535 and the first adhesive layer 51 may be smaller than a bonding force between the second portion 533 and the first adhesive layer 51. Therefore, when the battery cell 100 drops, this can reduce the risk of tearing the electrode plate in the electrode assembly 10 and the housing 30 and facilitate restriction of the displacement of the electrode assembly 10 in the housing 30.

In some embodiments, the second adhesive layer 53 may include only the first portion 531 or the third portion 535.

Refer to FIG. 3. The electrode assembly 10 is further provided with a first tab 101 and a second tab 103 that are spaced apart, and the first tab 101 and the second tab 103 each protrude from the first end surface 11.

In some embodiments, refer to FIG. 4. There is one first bonding portion 50. Preferably, a centrosymmetric line of the first bonding portion 50 coincides with a centrosymmetric line of the electrode assembly 10. More preferably, the first bonding portion 50 is located between the first tab 101 and the second tab 103.

Figure 6:
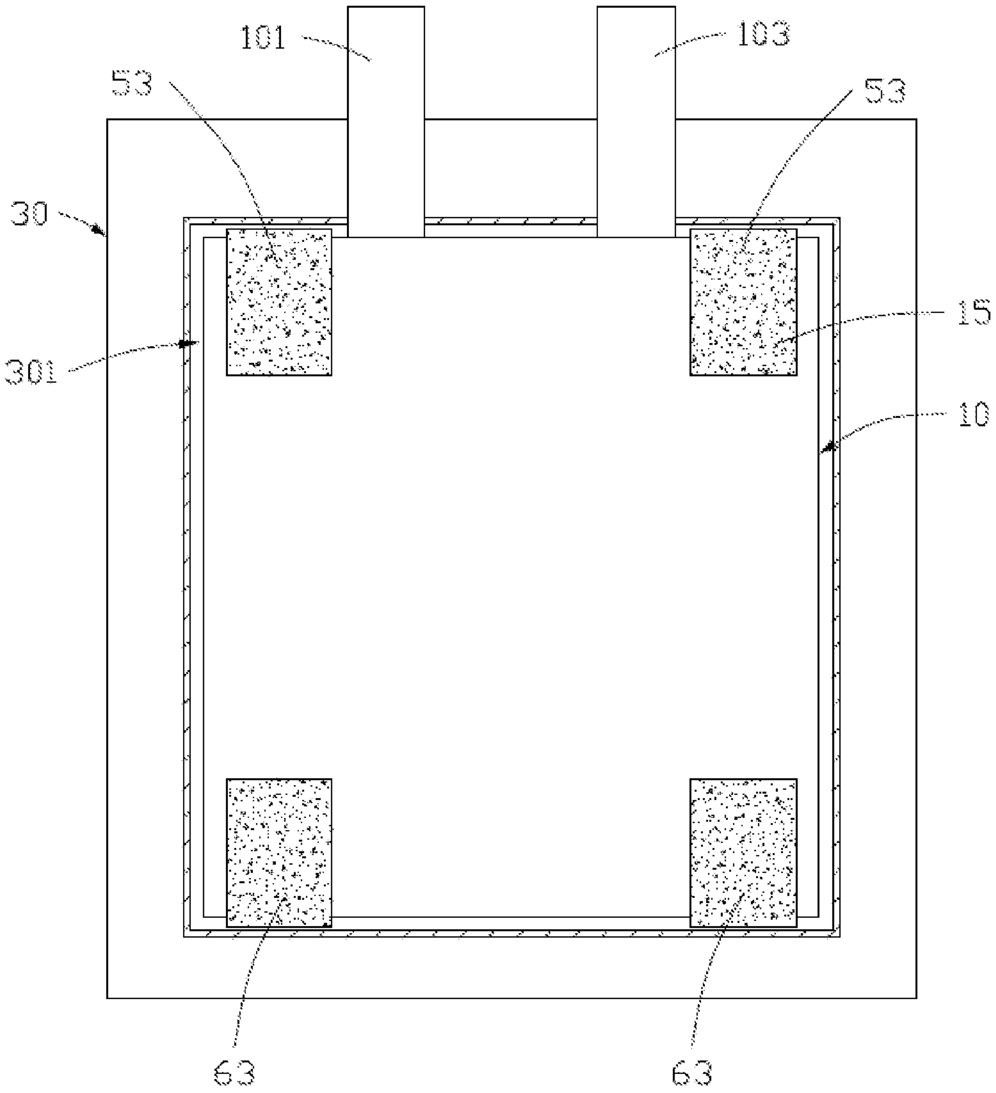
FIG. 6 is a cross-sectional view of a battery cell according to another embodiment of this application along the IV-IV line.
Figure 7:
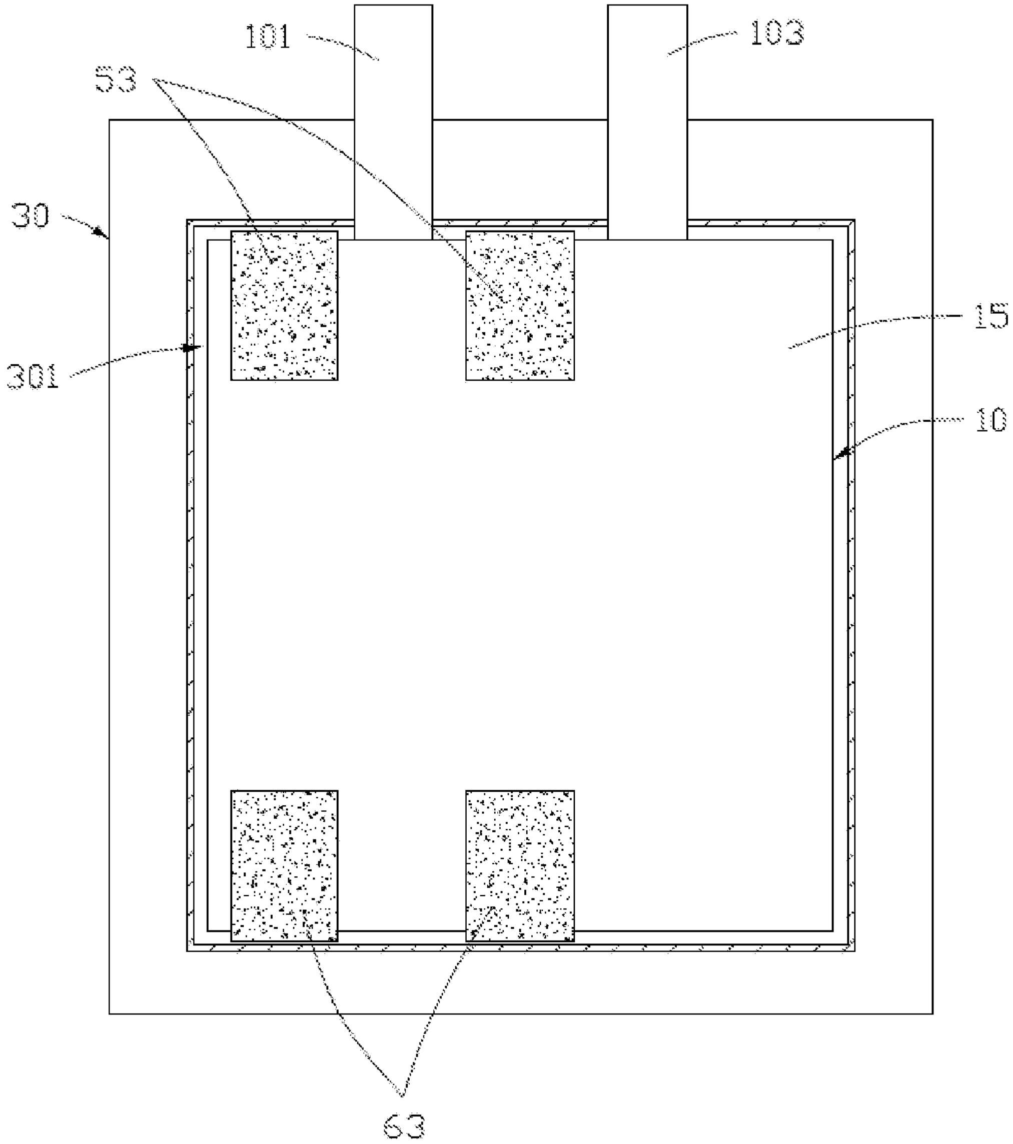
FIG. 7 is a cross-sectional view of a battery cell according to still another embodiment of this application along the IV-IV line.

In some other embodiments, there may be multiple first bonding portions 50, for example, two first bonding portions 50 as shown in FIG. 6. The two first bonding portions 50 are respectively disposed on two sides of the first tab 101. Specifically, one first bonding portion 50 may be located on a side of the first tab 101 face away from the second tab 103, and the other first bonding portion 50 may be located between the first tab 101 and the second tab 103 (as shown in FIG. 7) or on a side of the second tab 103 face away from the first tab 101 (as shown in FIG. 6).

In some embodiments, refer to FIG. 2 and FIG. 4. The battery cell 100 may further include a second bonding portion 60. The second bonding portion 60 includes a third adhesive layer 61 and a fourth adhesive layer 63, where the fourth adhesive layer 63 is disposed between the housing 30 and the third adhesive layer 61. The third adhesive layer 61 may be but is not limited to a hot melt adhesive, and the fourth adhesive layer 63 may be but is not limited to a polyester film.

The third adhesive layer 61 is bonded to the second end surface 13 and extends to the first surface 15 and the second surface 17 to bond with the first surface 15 and the second surface 17. This facilitates structural stability of the electrode assembly 10. In addition, when the battery cell 100 drops, the third adhesive layer 61 further stabilizes the structure of the electrode assembly 10 and can bond with the separator in the electrode assembly 10 when bonding with the second end surface 13, preventing the separator from shrinking, thereby reducing the risk of short circuits in the battery cell 100.

The fourth adhesive layer 63 includes a fourth portion 631, a fifth portion 633, and a sixth portion 635 connected in sequence. The fifth portion 633 is attached to a side of the third adhesive layer 61 face away from the second end surface 13, and the fourth portion 631 bonds the first inner wall 31 and a part of the third adhesive layer 61 located on the first surface 15. A bonding force between the fourth portion 631 and the third adhesive layer 61 is smaller than a bonding force between the fourth portion 631 and the first inner wall 31 and smaller than a bonding force between the third adhesive layer 61 and the first surface 15. When the battery cell 100 drops, the fourth adhesive layer 63 can further restrict the displacement between the electrode assembly 10 and the housing 30, and the fifth portion 633 can further provide a cushion for the electrode assembly 10, thereby facilitating maintenance of the stability of the battery cell 100. In a case of large impact, still refer to FIG. 5. The fourth adhesive layer 63 is at least partially separated from the third adhesive layer 61, reducing mutual pulling between the electrode assembly 10 and the fourth adhesive layer 63, thus further reducing the risk of tearing the electrode plate in the electrode assembly 10 and the housing 30. In addition, the fourth adhesive layer 63 keeps restricting the displacement of the electrode assembly 10, thus reducing the risk of deformation and short circuits of the electrode assembly 10 caused by impact of the electrode assembly 10 on the housing 30.

Further, the bonding force between the fourth portion 631 and the third adhesive layer 61 may be smaller than a bonding force between the fifth portion 633 and the third adhesive layer 61. Therefore, when the battery cell 100 drops, this can reduce the risk of tearing the electrode plate in the electrode assembly 10 and the housing 30 and facilitate restriction of the displacement of the electrode assembly 10 in the housing 30.

In some embodiments, the sixth portion 635 bonds the second inner wall 33 and a part of the third adhesive layer 61 on the second surface 17. A bonding force between the sixth portion 635 and the third adhesive layer 61 may be smaller than a bonding force between the sixth portion 635 and the second inner wall 33 and smaller than a bonding force between the third adhesive layer 61 and the second surface 17. This helps to reduce the risk of tearing the electrode plate in the electrode assembly 10 and the housing 30 during a drop.

Further, the bonding force between the sixth portion 635 and the third adhesive layer 61 may be smaller than a bonding force between the fifth portion 633 and the third adhesive layer 61. Therefore, when the battery cell 100 drops, this can reduce the risk of tearing the electrode plate in the electrode assembly 10 and the housing 30 and facilitate restriction of the displacement of the electrode assembly 10 in the housing 30.

The second bonding portion 60 and the first bonding portion 50 may be aligned with each other or may be partially or entirely staggered. As shown in FIG. 4, FIG. 6, and FIG. 7, the second bonding portion 60 and the first bonding portion 50 are aligned with each other. There may be one or more second bonding portions 60. As shown in FIG. 4, there is one second bonding portion 60. Preferably, a centrosymmetric line of the second bonding portion 60 coincides with a centrosymmetric line of the electrode assembly 10. As shown in FIG. 6 and FIG. 7, there are two second bonding portions 60, and the two second bonding portions 60 are spaced apart.

Figure 5:
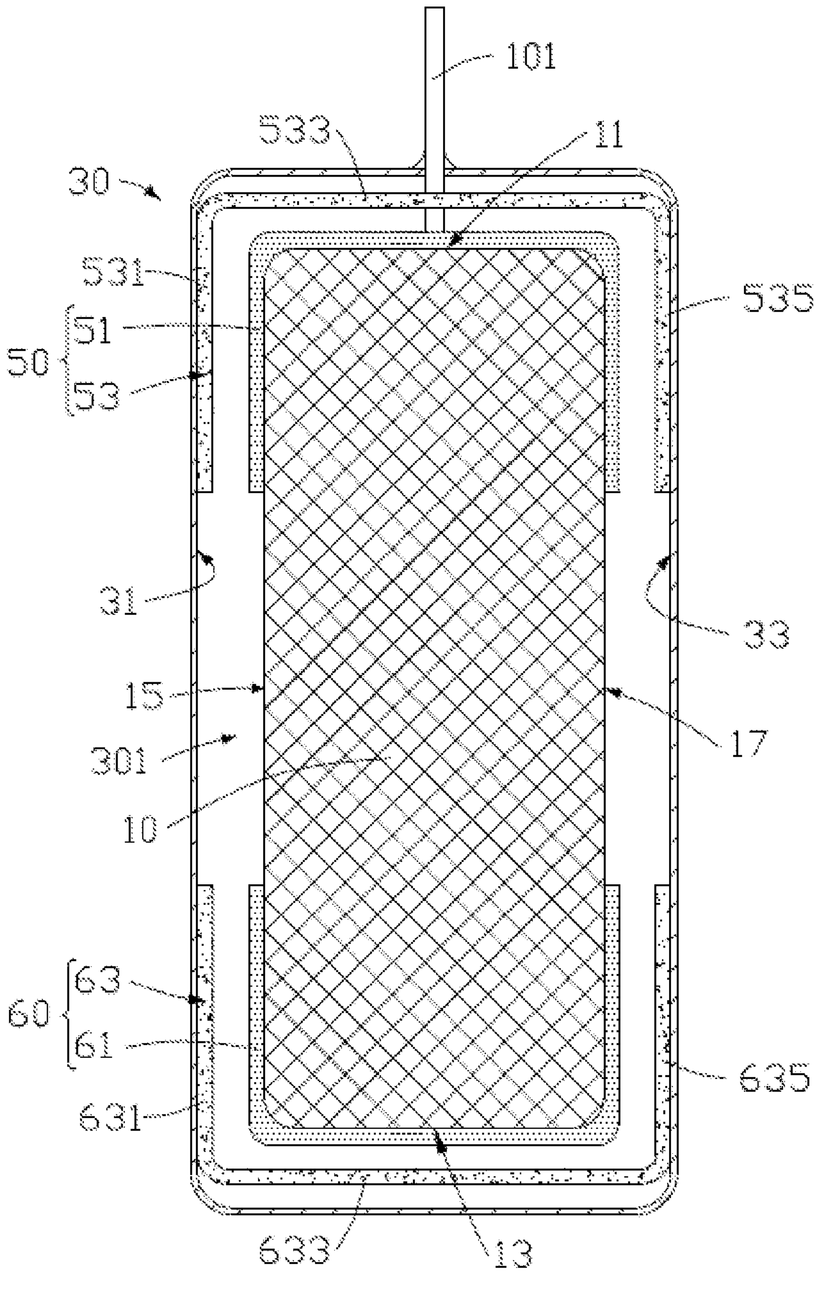
FIG. 5 is a section view of a battery cell according to another embodiment of this application along the II-II line.

The battery cell 100 may further include an electrolyte (not shown in the figure), where the electrolyte is packaged in the housing 30, and the electrode assembly 10 is soaked in the electrolyte. A bonding force between the first adhesive layer 51 and the second adhesive layer 53 and a bonding force between the third adhesive layer 61 and the fourth adhesive layer 63 weaken due to the electrolyte, causing at least partial separation of the first adhesive layer 51 and the second adhesive layer 53 and at least partial separation of the third adhesive layer 61 and the fourth adhesive layer 63 in the battery cell 100. As shown in FIG. 5, the first adhesive layer 51 and the second adhesive layer 53 are completely separated, and the third adhesive layer 61 and the fourth adhesive layer 63 are completely separated.

Figure 8:
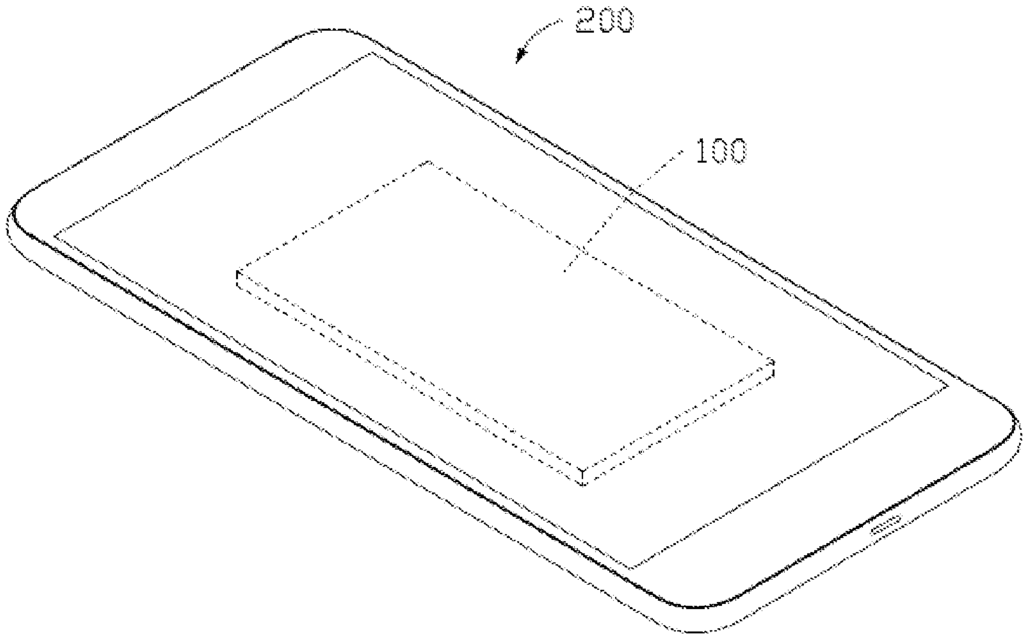
FIG. 8 is a schematic structural diagram of an electronic apparatus according to an embodiment of this application.

Refer to FIG. 8. The battery cell 100 is applied to an electronic apparatus 200, where the electronic apparatus 200 may be but is not limited to an electric toy, a computer, a mobile phone, a gaming device, an electric vehicle, or the like.

This application is described in detail below by using Example and Comparative Example. It should be understood that parameters in this application are not limited to those recorded in Example and Comparative Example but can be selected based on an actual need.

EXAMPLE

Figure 9A:
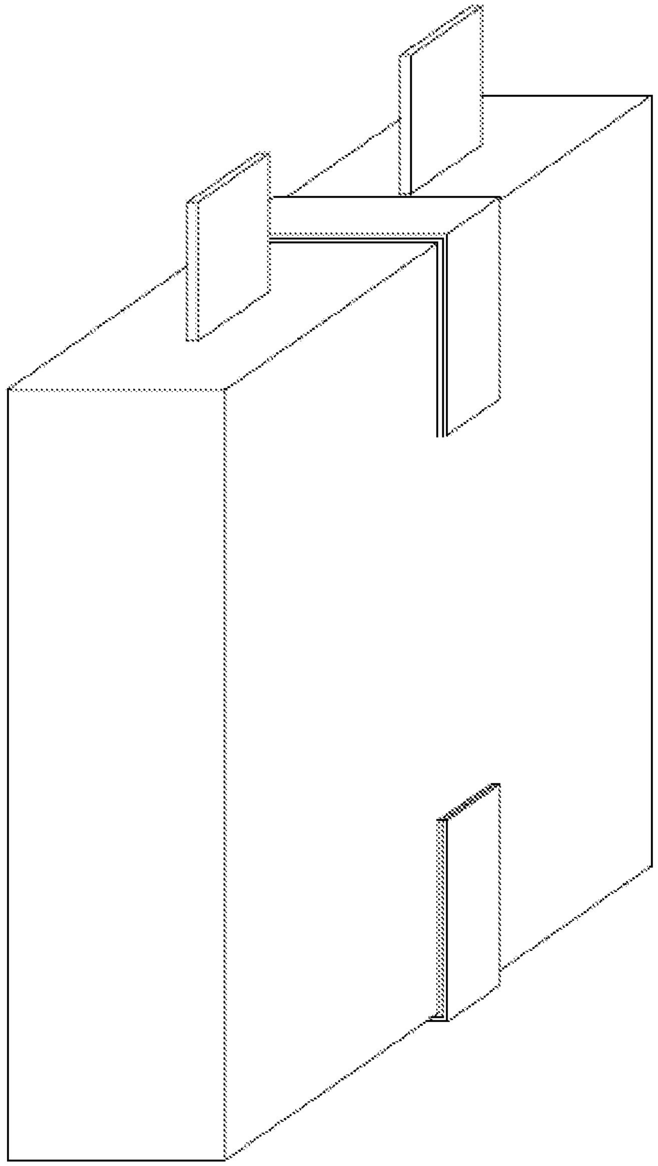
FIG. 9*a* is a schematic structural diagram of an electrode assembly attached with a first bonding portion and a second bonding portion according to an embodiment of this application.

The foregoing first bonding portion and the foregoing second bonding portion were attached to the electrode assembly, as shown in FIG. 9*a*. The centrosymmetric line of the first bonding portion and the centrosymmetric line of the second bonding portion both coincide with the centrosymmetric line of the electrode assembly. A side, of the first adhesive layer of the first bonding portion, face away from the second adhesive layer was bonded to the electrode assembly, and a side, of the third adhesive layer of the second bonding portion, face away from the fourth adhesive layer was bonded to the electrode assembly.

The electrode assembly attached with tape was packaged and filled with the electrolyte and then went through formation at a temperature ranging from 80° C. to 85° C. During formation, the first portion and the third portion of the second adhesive layer and the fourth portion and the sixth portion of the fourth adhesive layer are bonded to a packaging bag. Subsequently, the battery cells were prepared according to a production process of ordinary battery cells.

Comparative Example

Figure 9B:
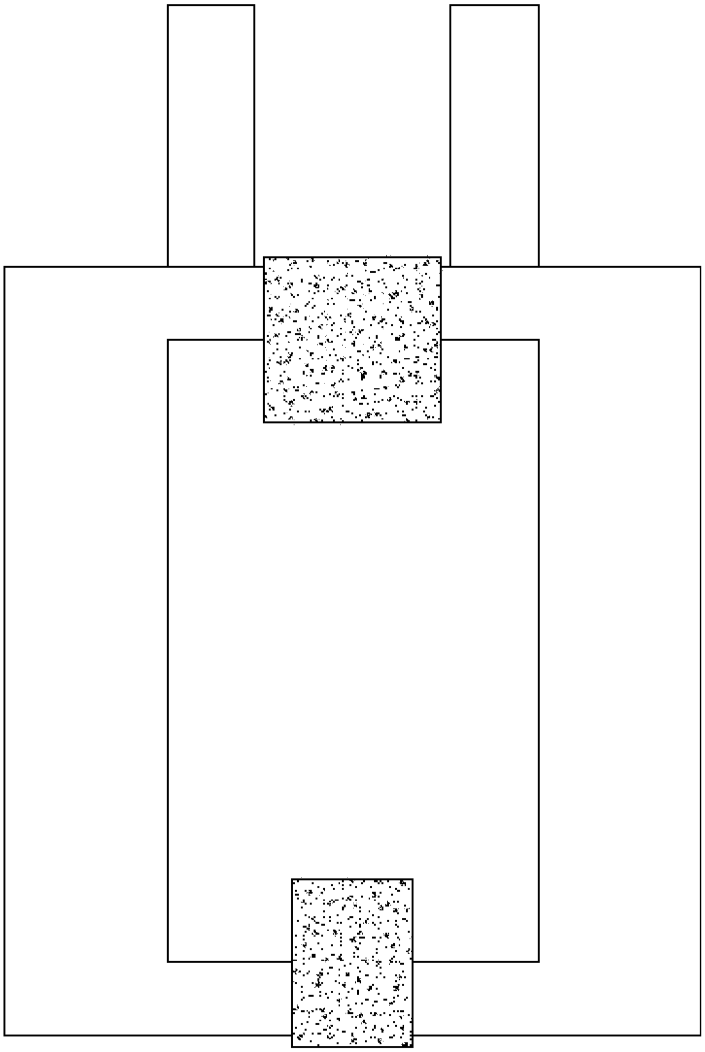
FIG. 9*b* is a schematic structural diagram of an electrode assembly attached with a head tape, a tail tape, and an SIS tape according to a comparative example of this application.
Figure 9C:
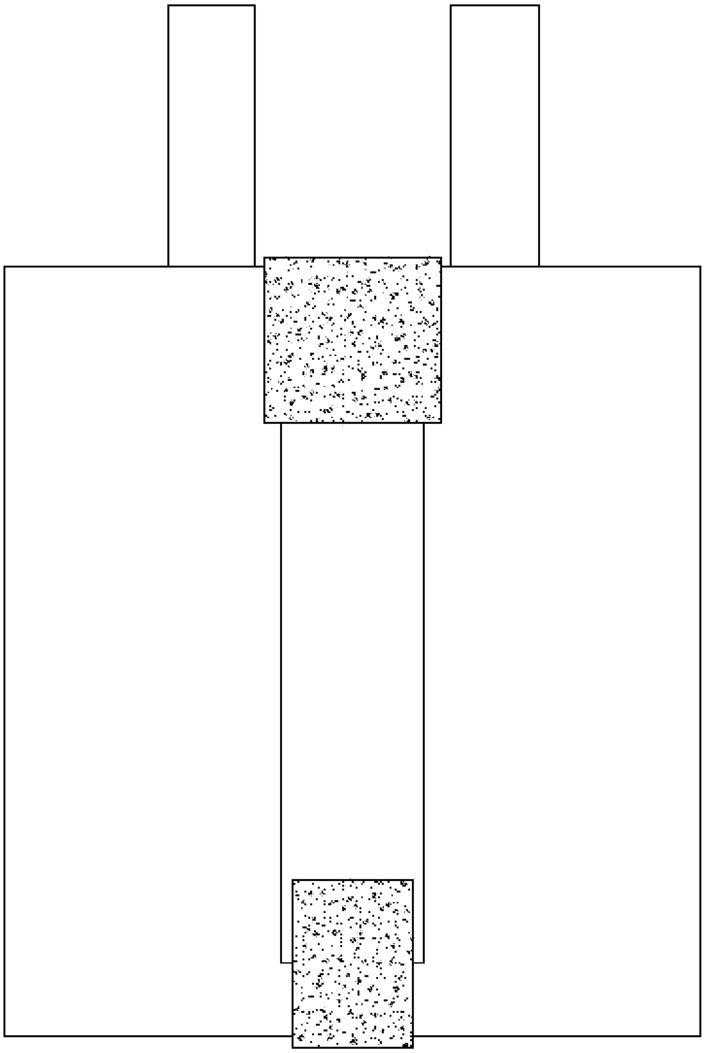
FIG. 9*c* is a schematic structural diagram of an electrode assembly attached with a head tape, a tail tape, and a green tape according to a comparative example of this application.

The Comparative Example differs from the Example in that the electrode assembly was attached with a head tape near the tabs, a tail tape away from the tabs, an SIS (styrene-isoprene-styrene) tape attached to the first surface and connecting the head insulation tape and the tail insulation tape, and a green tape attached to the second surface and connecting the head tape and the tail tape, as shown in FIG. 9*b* and FIG. 9*c*. The head tape and tail tape are common tape materials in the field. During packaging of the electrode assembly, the SIS tape faced toward a deep pit surface of the packaging bag and was bonded to the packaging bag after formation; and the green tape faced toward a shallow pit surface of the packaging bag and was bonded to the packaging bag after the formation.

A first drop test was carried out on 20 battery cells made in the Example and 20 battery cells made in the Comparative Example, and a second drop test was carried out on 20 battery cells made in the Example and 20 battery cells made in the Comparative Example. The corresponding drop results are recorded in Table 1 below. The first drop test was as follows: A fully charged battery cell with the outer shallow pit surface attached with tapes was put into a fixture and fastened. Then, the battery cell was dropped from a height of 1.2 m in a way that the bottom surface, right surface, top surface, left surface, deep pit surface, shallow pit surface, top left corner, top right corner, bottom left corner, and bottom right corner of the battery cell sequentially hit onto a steel plate with a thickness of 10 mm. This was defined as one round. Each battery was dropped for 10 rounds. If there was no fire, no explosion, and no leakage, the battery cell passed the test. The second drop test was as follows: A fully charged battery cell with the outer shallow pit surface attached with tapes was put into a fixture and fastened. Then, the battery cell was dropped from a height of 1.8 m in a way that the bottom surface, top surface, deep pit surface, top left corner, top right corner, bottom left corner, and bottom right corner of the battery cell sequentially hit onto a steel plate with a thickness of 10 mm. Each battery was dropped for 3 rounds. If there was no fire, no explosion, and no leakage, the battery cell passed the test.

TABLE 1

| Group | Test result | |
|---|---|---|
| | Pass rate in first drop test | Pass rate in second drop test |
| Comparative Example | 90% | 100% |
| Example | 70% | 100% |

It can be seen from the foregoing drop test results recorded in Table 1 that the drop resistance of the battery cells made in the Example is better than the drop resistance of the battery cells made in the Comparative Example.

In the battery cell 100 and the electronic apparatus 200 using such battery cell 100 in the embodiments of this application, when the battery cell 100 drops, the second adhesive layer 53 can restrict the displacement between the electrode assembly 10 and the housing 30, and the second portion 533 can provide a cushion for the electrode assembly 10, thereby facilitating maintenance of the stability of the battery cell 100. In a case of large impact, still refer to FIG. 5. The second adhesive layer 53 is at least partially separated from the first adhesive layer 51, reducing mutual pulling between the electrode assembly 10 and the second adhesive layer 53, thus reducing the risk of tearing the electrode plate in the electrode assembly 10 and the housing 30. In addition, the second adhesive layer 53 keeps restricting the displacement of the electrode assembly 10, thus reducing the risk of deformation and short circuits of the electrode assembly 10 caused by impact of the electrode assembly 10 on the housing 30.

In addition, persons of ordinary skill in the art can make various other corresponding changes and modifications according to the technical concept of this application, and all such changes and modifications should fall within the protection scope of this application.

What is claimed is:

1. A battery cell, comprising:

an electrode assembly comprising a first end surface, and a first surface and a second surface disposed to face away from each other, wherein the first end surface connects the first surface and the second surface;

a housing accommodating the electrode assembly, wherein the housing comprises a first inner wall and a second inner wall disposed opposite to each other, the first inner wall being disposed to face the first surface and the second inner wall being disposed to face the second surface; and a first bonding portion comprising a first adhesive layer and a second adhesive layer provided between the housing and the first adhesive layer, wherein the first adhesive layer is bonded to the first end surface and extends to the first surface and the second surface to bond with the first surface and the second surface; and the second adhesive layer comprises a first portion, and a second portion connecting to the first portion, wherein the first portion is bonded to the first inner wall, and the second portion is located on a side of the first adhesive layer facing away from the first end surface; wherein a bonding force between the first portion and the first adhesive layer is smaller than a bonding force between the first portion and the first inner wall, smaller than a bonding force between the first adhesive layer and the first surface, and smaller than a bonding force between the second portion and the first adhesive layer.

2. The battery cell according to claim 1, wherein the second adhesive layer further comprises a third portion opposite the first portion, wherein the third portion is bonded to the second inner wall, and a bonding force between the third portion and the first adhesive layer is smaller than a bonding force between the third portion and the second inner wall and smaller than a bonding force between the first adhesive layer and the second surface.

3. The battery cell according to claim 2, wherein the bonding force between the third portion and the first adhesive layer is smaller than the bonding force between the second portion and the first adhesive layer.

4. The battery cell according to claim 1, wherein a centrosymmetric line of the first bonding portion coincides with a centrosymmetric line of the electrode assembly.

5. The battery cell according to claim 1, wherein the battery cell further comprises a second end surface facing away from the first end surface, the second end surface connecting the first surface and the second surface; and the battery cell further comprises a second bonding portion, the second bonding portion comprising a third adhesive layer and a fourth adhesive layer, wherein the third adhesive layer is bonded to the second end surface and extends to the first surface and the second surface to bond with the first surface and the second surface, and the fourth adhesive layer comprises a fourth portion, a fifth portion, and a sixth portion connected in sequence, wherein the fifth portion is located on a side of the third adhesive layer facing away from the second end surface, the fourth portion is bonded to the first inner wall, and a bonding force between the fourth portion and the third adhesive layer is smaller than a bonding force between the fourth portion and the first inner wall and smaller than a bonding force between the third adhesive layer and the first surface.

6. The battery cell according to claim 5, wherein the sixth portion is bonded to the second inner wall, and a bonding force between the sixth portion and the third adhesive layer is smaller than a bonding force between the sixth portion and the second inner wall and smaller than a bonding force between the third adhesive layer and the second surface.

7. The battery cell according to claim 5, wherein a centrosymmetric line of the second bonding portion coincides with a centrosymmetric line of the electrode assembly.

8. A battery cell, comprising:

an electrode assembly comprising a first end surface, and a first surface and a second surface disposed to face away from each other, wherein the first end surface connects the first surface and the second surface;

a housing configured to accommodate the electrode assembly, wherein the housing comprises a first inner wall and a second inner wall disposed opposite to each other, the first inner wall being disposed to face the first surface and the second inner wall being disposed to face the second surface; and a first bonding portion comprising a first adhesive layer and a second adhesive layer provided between the housing and the first adhesive layer, wherein the first adhesive layer is bonded to the first end surface and extends to the first surface and the second surface to bond with the first surface and the second surface; and the second adhesive layer comprises a first portion, a second portion, and a third portion connected in sequence, wherein the second portion is located on a side of the first adhesive layer facing away from the first end surface, the first portion is bonded to the first inner wall but not bonded to the first adhesive layer opposite the first inner wall, and the third portion is bonded to the second inner wall but not bonded to the first adhesive layer opposite the second inner wall.

9. The battery cell according to claim 8, wherein the battery cell further comprises a second end surface facing away from the first end surface, the second end surface connecting the first surface and the second surface; and the battery cell further comprises a second bonding portion, the second bonding portion comprising a third adhesive layer and a fourth adhesive layer, wherein the third adhesive layer is bonded to the second end surface and extends to the first surface and the second surface to bond with the first surface and the second surface, and the fourth adhesive layer comprises a fourth portion, a fifth portion, and a sixth portion connected in sequence, wherein the fifth portion is located on a side of the third adhesive layer facing away from the second end surface, the fourth portion is bonded to the first inner wall but not bonded to the first adhesive layer opposite the first inner wall, and the sixth portion is bonded to the second inner wall but not bonded to the first adhesive layer opposite the second inner wall.

10. An electronic apparatus, wherein the electronic apparatus comprises the battery cell according to claim 1.

* * * * *